Feb. 13, 1945.   J. T. HOPKINS   2,369,353
TRACTOR PLOW CONSTRUCTION
Filed Aug. 4, 1943
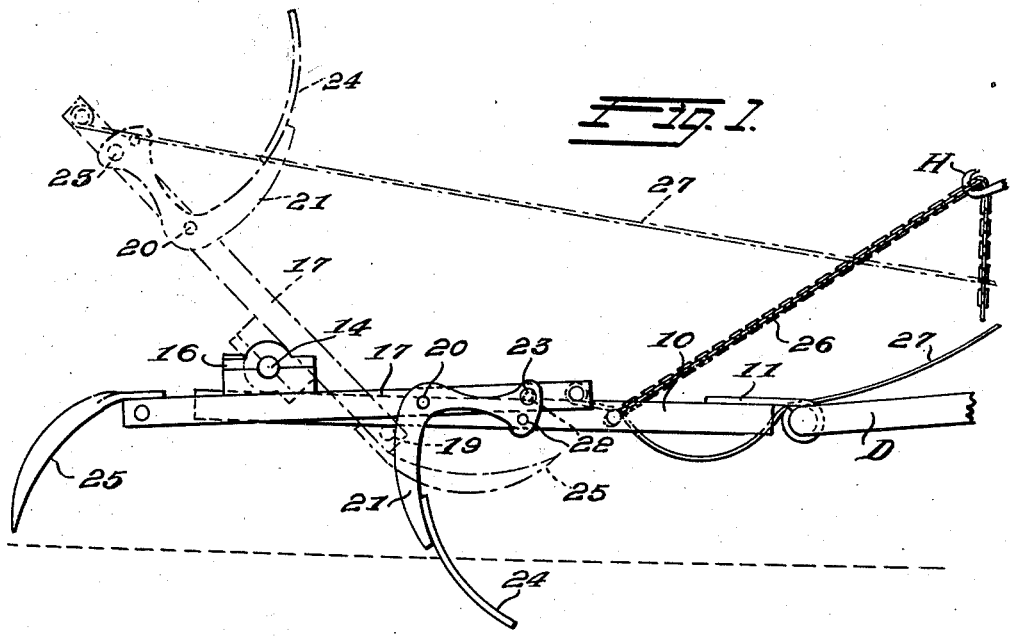
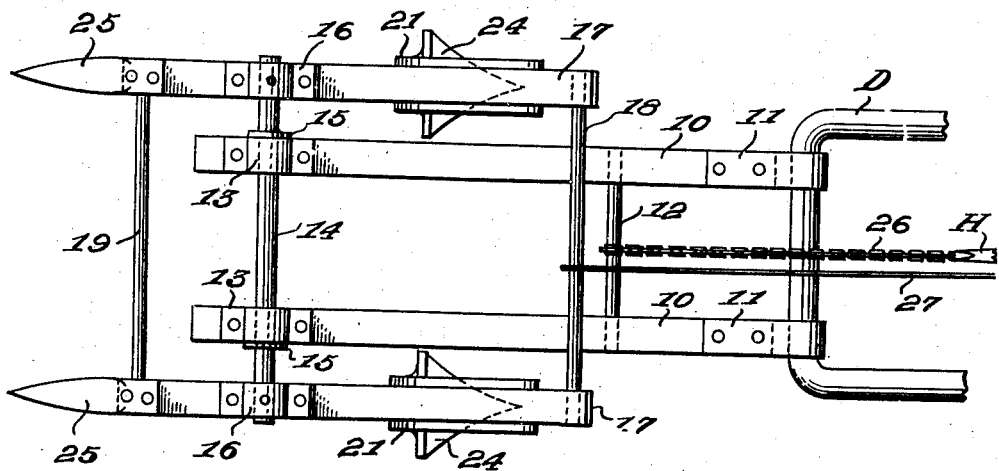
Inventor
Joe Terry Hopkins
By James Atkins
Attorney Patented Feb. 13, 1945

2,369,353

UNITED STATES PATENT OFFICE 2,369,353

TRACTOR PLOW CONSTRUCTION

Joe Terry Hopkins, Washington, Ga.

Application August 4, 1943, Serial No. 497,356

5 Claims. (Cl. 97—74)

This invention relates to a tractor plow construction.

The invention is more particularly concerned with an improved plow or cultivator construction adapted to be drawn by a tractor or other power means, and embodying means effective through power of the draft means for raising the points or ground-engaging elements to an inoperative position when it is desired to interrupt the plowing or cultivating operation, as when making a turn for operation in a reverse direction.

It is appreciated that plows of this general nature have heretofore been provided or proposed, but such plows have, to my knowledge, been of relative complicated construction and required the manual conditioning of certain operating elements for effecting the lifting of the points or ground-engaging elements through power of the draft means.

A primary object of this invention is the provision of a plow or cultivator construction adapted to be drawn by draft means and normally operative to plow one or more furrows, and the plowing operation being readily interrupted through movement of the power means without effort on the part of the operator thereof.

A further object of the invention is the provision of an improved plow or cultivator construction having ground-engaging points and adapted to be drawn by power means, the points being adjustably supported for varying depths of furrows and also being capable of being lifted from ground engagement to an inoperative position upon backing of the power means without manual effort on the part of the operator, and the points being capable of restoration to operative ground-engaging position by simple draw means operative by the operator of the draft means.

A still further object of the invention is the provision of a plow or cultivator construction of the above noted character which is simple in structure, efficient in operation, and which is capable of manufacture at relatively low cost.

For a more complete understanding of the nature and object of the invention, reference will be had to the following detailed description, taken in connection with the accompanying drawing, wherein Figure 1 is a side elevational view of a plow or cultivator constructed in accordance with a preferred embodiment of the invention, the plow being shown in operative connection with the rear end of a tractor and parts thereof being shown by dot-and-dash lines in an inoperative position.

Fig. 2 is a top plan view of the structure illustrated in Fig. 1.

Referring now to the drawing by use of reference characters, 10 designates the main plow supports and which, at their forward ends, are provided with suitable hinges 11 for pivotal connection with the draw bar D of a tractor. The supports 10 are connected by a stay rod 12 intermediate their ends for maintaining same in spaced parallel relation, the supports and stay rod providing a main frame.

The rear ends of supports 10 are provided with bearings 13 in which are rotatably journalled a shaft 14 which is parallel with the stay rod 12, and the ends of the shaft project substantially beyond the outer sides of the supports 10. Collars 15 are suitably connected to shaft 14 adjacent the respective bearings 13 for holding the shaft against axial movement.

The opposite ends of the shaft 14 extend into clamp bearings 16 which are supported by rocking beams 17, the beams being rockable with the shaft in bearings 13. The beams 17 are provided with stay rods 18 and 19 and rear ends, the stay rods providing, with the beams, a rockable frame for supporting structural elements about to be described.

Pivotally connected as at 20 to each beam 17 intermediate the stay rods 18 and 19 and adjacent the front end of the beam is a plow or point hanger 21. The hangers are of generally L-form and have, adjacent the ends of corresponding arms thereof, a pair of apertures 22 for selective reception of securing elements 23 which extend into the beams whereby the hangers are adjustable to provide the proper angle of the plows or points 24 which are suitably secured to the other or depending arms of the hangers.

While only two plows or points 24 are illustrated, it is to be understood that three or more may be utilized, as desired, by providing relatively long stay rods 18 and 19 and connecting same to and through beams corresponding in number to that of the plows desired. Several plows or points 24 are, of course, desirable for cultivation purposes, but the important feature of the invention is clearly disclosed with the two plows as shown.

Rigidly secured to the rear ends of the beams 17 are spikes 25 which, as shown in Fig. 1, extend downwardly and rearwardly with their ends out of contact with the ground when the plows or points 24 are in ground-engaging position.

A chain 26 is secured at one end thereof to the stay rod 12 and is adapted to be engaged adjacent its other end in the hook of a hanger H suitably fastened to the tractor for adjustably holding the plows at desired depths in the ground. A rope or other suitable flexible draw member 27 is secured at one end thereof to the forward stay rod 18 and is adapted to be controlled by the operator of the tractor in a manner later set forth.

In the operation of the improved plow as disclosed, upon forward movement thereof the plow points dig into the ground to a depth determined by the position of attachment of the chain 26 with the hanger H, and the stay rod 18 engages supports 10 and maintains the beams 17 against rocking movement in a clockwise direction. Upon reaching the ends of rows being plowed or cultivated, and it is desired to turn in advance of cultivating adjacent rows in the opposite direction, the tractor is backed up slightly, whereupon the spikes 25 penetrate the ground through the assistance of the camming action of the rear convex surfaces of the plow points. This results in the beams 17 being rotated counter-clockwise, and when the spikes again leave the ground the weight of plows 24 will further swing the beams until the stay rod 19 engages beneath the supports 10, as is shown by dot-and-dash lines in Fig. 1.

It is to be particularly noted that the hangers 21 and points 24 are so disposed on the beams 17, and their combined weight is such in comparison with that of the spikes 25, that when beams 17 pass the vertical in their counter-clockwise rotation they will swing by gravity and remain in inoperative position, with the stay rod 19 engaging the undersides of the supports 10. Little effort, however, will be required to trip the beams 17 back into operative position, and this is accomplished upon pulling on the rope 27 by the operator. While in the return of the beams the spikes will again engage the ground in advance of the plow points, forward movement will readily draw the points into ground-engaging position.

Thus it will be seen that, with the structure disclosed, rows may be cultivated to the extreme ends thereof and the points readily raised into inoperative position upon slight backing of the tractor, thereby avoiding digging up the ground beyond the ends of the rows. The plow points will remain in inoperative position until it is desired to restore them to operative position, whereupon a slight pull on the draw member will trip the beams clockwise and the plow will then again be in working position.

It is to be particularly noted that the improved plow or cultivator is simple in structure but highly efficient in operation, with a minimum expenditure of manual effort. While I have disclosed but a single specific embodiment of my invention, such is to be considered as illustrative only, and not restrictive, the scope of the invention being defined in the sub-joined claims.

What I claim and desire to secure by U. S. Letters Patent is:

1. A plow or cultivator construction comprising a frame adapted to be drawn by power means, a second elongated frame pivotally supported intermediate its ends on the first frame, plow points supported by the second frame at one side of its pivotal connection and normally operative to engage within the ground, and ground-engaging means supported by the second frame on the opposite side of its pivotal connection, said last means being normally out of ground contact and operative upon reverse movement of the power means to rotate the second frame on its pivotal connection with the first frame and elevate the plow points to an inoperative position.

2. A plow or cultivator construction comprising an elongated supporting frame having means at one end thereof for pivotal connection with a tractor, a second elongated frame pivotally supported intermediate its ends on the first frame adjacent the rear end thereof, plow points carried by the second frame in advance of its pivotal connection and normally engageable in the ground upon forward movement by the tractor, ground-engaging means carried by the second frame rearwardly of its pivotal connection normally out of ground contact and operative upon reverse movement of the tractor to engage the ground and rock the second frame on its pivotal connection and thus raise the plow points to an inoperative position with the points disposed relative to the pivotal connection to retain same in inoperative position, and a draw member connected with the second frame for tension by an operator to rock the second frame in a forward direction position and thus restore the points to operative ground-engaging position.

3. A plow or cultivator construction according to claim 2, wherein said second frame is substantially wider than the first frame, and stay rods in said second frame engageable with the top and bottom of the first frame in operative and inoperative positions of the plow points respectively.

4. A plow or cultivator construction comprising a frame, a second frame rockably supported on the first frame, plow points connected to the second frame and engageable in the ground upon forward movement of the first frame, means carried by the second frame and engageable with the ground upon reverse movement of the first frame for rocking said second frame to position the plow points in operative position, stop means on said second frame engageable with the first frame to prevent rocking of the second frame upon engagement of the plow points in the ground, and other stop means on the second frame for engagement with the first frame to limit rocking movement of the second frame by said first means with the plow points raised to inoperative position.

5. A plow or cultivator construction comprising a supporting fame having means for pivotal connection with a tractor or the like, a second frame rockably supported by the first frame, ground-furrowing means carried by the second frame and operative for ground engagement upon forward movement of the frames, and means rigidly supported by the second frame for rocking movement therewith and operative upon movement of the frames in a reverse direction for moving the ground-furrowing means out of ground engagement.

JOE TERRY HOPKINS.